UNITED STATES PATENT OFFICE.

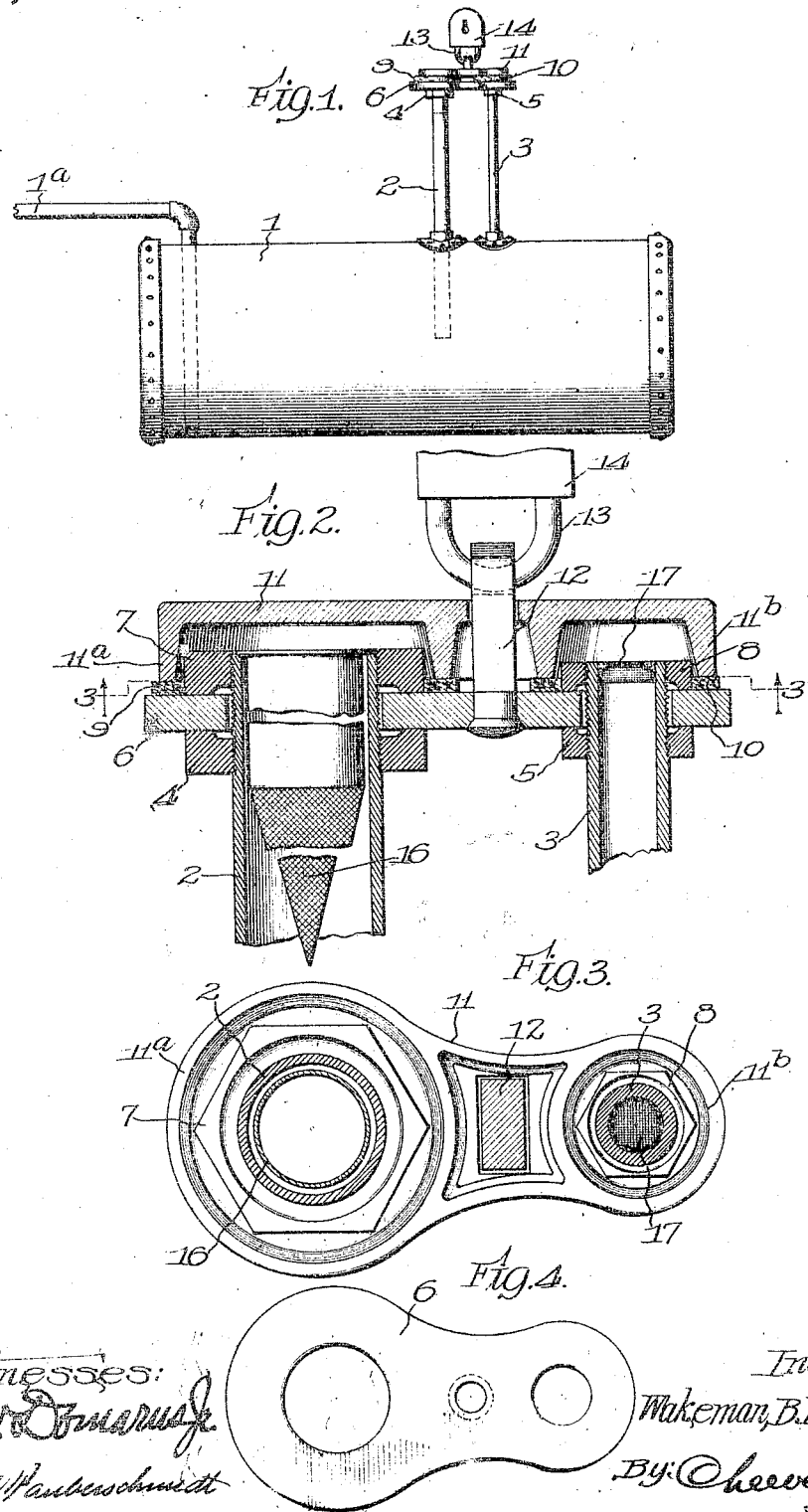

WAKEMAN B. HENION, OF CHICAGO, ILLINOIS.

STORAGE-TANK.

994,676.

Specification of Letters Patent. Patented June 6, 1911.

Application filed August 15, 1910. Serial No. 577,326.

*To all whom it may concern:*

Be it known that I, WAKEMAN B. HENION, a citizen of the United States, residing at Chicago, in the county of Cook and State of Illinois, have invented a certain new and useful Improvement in Storage-Tanks, of which the following is a specification.

My invention relates to filling and venting pipes for storage tanks—more especially for the storage of gasolene and inflammable fluids, safe and convenient handling of which concerns every user, and is demanded by law.

It is the general object of my invention to provide a simple, cheap construction, capable of meeting the suggestion of the above requirements.

I am fully aware that there is nothing new in the use of lock nuts themselves nor in the use of a lock nut upon a pipe, but I do claim as new the simple arrangement of two pipes, mechanically and securely connected together which when locked cannot be taken apart, or disconnected from the tank with an ordinary mechanical tool, and when open or closed, are simultaneously opened or closed.

I accomplish my objects by the mechanism illustrated in the accompanying drawings, in which—

Figure 1 is a side elevation of my complete apparatus. Fig. 2 is a fragmentary sectional view taken longitudinally through the center of the main and vent pipes and showing said pipes and the closure in position thereon. Fig. 3 is a sectional view looking from beneath on the line 3—3, Fig. 2. Fig. 4 is a plan view of the base plate drawn to a slightly reduced scale.

Similar numerals refer to similar parts throughout the several views.

The tank 1 under ordinary circumstances will be located about three feet under ground, and may be of any desired dimensions. Rising from it to an extent sufficient to project somewhat above the surface of the ground are two pipes 2 and 3, the pipe 2 being the receiving pipe and preferably having a larger diameter than the vent pipe 3. It is desirable that the main pipe enter a few inches below the top of the tank while the vent pipe terminates at or near the top of the tank. Pipe 1ª extends from a point near the bottom of the tank up through the top and off to any desired point.

Pipes 2 and 3 are threaded at their upper ends for a distance just sufficient to accommodate first, the lower lock nuts 4 and 5 respectively, the base plate 6 above said nuts, and finally the upper lock nuts 7 and 8 respectively. Said base plate, which is shown separately in plan in Fig. 4, is so formed as to encircle both of said pipes, but by preference does not actually engage the threads thereof, being loose enough to slip over the pipes without contacting or damaging the threads. When the parts are assembled the plate rests upon the lock nuts 4 and 5 and is rigidly held in position by the upper lock nuts 7 and 8. It is clear that when the upper nuts are screwed tight all of the parts mentioned will be very rigidly held together, and that furthermore the lower nuts cannot be backed down nor the plate lowered.

Preferably the plate projects beyond the edges of the nuts in order to support gaskets 9 and 10 which are arranged concentric with the pipes 2 and 3 respectively, and surround the nuts 7 and 8 respectively.

Fitting over the upper ends of the pipes is a cover 11 which is provided with two downwardly projecting annular flanges 11ª and 11ᵇ which rest upon the gaskets 9 and 10 respectively, as best shown in Fig. 2. In outline the cover is similar to the base plate but is of slightly smaller dimensions. It will be noted that the top of said cover is smooth and that it lies horizontal when in use, in consequence whereof it tends to shed water. Furthermore, the depending flanges 11ᵇ cover the parts within and act as a further protection against the weather.

A stud 12 is rigidly secured to the base plate so as to come substantially midway between the pipes 2 and 3, and extends upward through a suitable aperture in the cover. By preference the upper portion of the stud is rectangular, being shouldered to rest upon the base plate. At a point just above the top of the cover when the parts are assembled the stud is apertured to receive the bow 13 of a padlock 14, which serves to prevent the removal of the cover by an unauthorized person.

It is desirable that the main pipe 2 be provided with a gauze 16 for straining the oil as it enters and preventing grit and foreign substance from getting into the tank. Similarly it is desirable that the vent pipe 3 be provided with a gauze 17.

In operation, the base plate 6 remains permanently in place, held there by the lock nuts above and below it. When the cover is in position all that is necessary to remove it is to remove the padlock from the stud 12 and lift the cover off. The act of lifting the cover will not only open the main pipe but will simultaneously open the vent pipe. This is important because if by inadvertence or ignorance an attempt be made to pour the oil into the main pipe when the vent is closed, the air confined in the tank will ordinarily stop the flow in the main pipe after a moment and will result in the spilling of oil upon the ground and surrounding objects with consequent danger of fire. With the vent automatically open when the main pipe is open, spilling from this cause cannot occur. Furthermore, with my construction in which a single cover serves for both pipes, the apparatus may be completely locked by merely securing a single part of the apparatus. With the stud riveted in place, as shown, and the threads on the pipes only long enough to receive the plate and nuts, the apparatus cannot be taken apart by any ordinary tools. Furthermore the flanges on the cover prevent it from being rotated out of place. Consequently the outfit is completely protected and the tank cannot be tampered with nor the contents removed without detection.

Although it is desirable to employ gaskets 9 and 10, which are preferably made of leather in order to resist the action of the gasolene, these gaskets may be entirely omitted if desired.

Having thus described my invention, what I claim as new and desire to secure by Letters Patent is:—

1. In combination, a tank, a filler pipe and vent pipe, both screwing into said tank and screw threaded near the top, said filler and vent pipes being adjacent to each other, lock nuts screwed onto said filler and vent pipes near the top thereof, a plate apertured to accommodate said pipes and resting upon said lock nuts, other lock nuts screwing onto said filler and vent pipes over said plate to hold the latter fast, a cover over the upper ones of said lock nuts, and means for locking said cover in position.

2. In a storage outfit for gasolene and the like, the combination of a tank, a pipe through which the liquid may be drawn from the tank, a filler pipe and vent pipe, both screwing into said tank and screw threaded near the top, said filler and vent pipes being adjacent to each other, lock nuts screwed onto said filler and vent pipes near the top thereof, a plate apertured to accommodate said pipes and resting upon said lock nuts, other lock nuts screwing onto said filler and vent pipes over said plate to hold the latter fast, a cover supported by said plate and chambered on the underside to fit over the upper ones of said nuts and means for locking said cover to said plate.

In witness whereof, I have hereunto subscribed my name in the presence of two witnesses.

WAKEMAN B. HENION.

Witnesses:
HOWARD M. COX,
MARGARET D. ROBB.